United States Patent [19]

Sakamoto

[11] Patent Number: 4,658,302

[45] Date of Patent: Apr. 14, 1987

[54] IMAGE READER

[75] Inventor: Masahiro Sakamoto, Tokyo, Japan

[73] Assignee: Canon Kabushiki Kaisha, Tokyo, Japan

[21] Appl. No.: 664,303

[22] Filed: Oct. 24, 1984

[30] Foreign Application Priority Data

Oct. 28, 1983 [JP] Japan .................. 58-200754

[51] Int. Cl.$^4$ .................................... H04N 1/024
[52] U.S. Cl. .................... 358/294; 358/213; 358/293
[58] Field of Search ............... 358/280, 293, 294, 213, 358/267; 250/578; 382/67

[56] References Cited

U.S. PATENT DOCUMENTS 4,423,439 12/1983 Watanabe .................. 358/287

Primary Examiner—Edward L. Coles, Sr.
Attorney, Agent, or Firm—Fitzpatrick, Cella, Harper & Scinto

[57] ABSTRACT

An image reader comprises a readout device for storing charges in a predetermined period to read an image of an original sheet and outputting the stored charges in a following period, an image signal processing device for processing the output image signal of the readout device, and disabling device for disabling the image signal processing device for an image signal output period immediately following a read request signal to the readout device.

10 Claims, 8 Drawing Figures

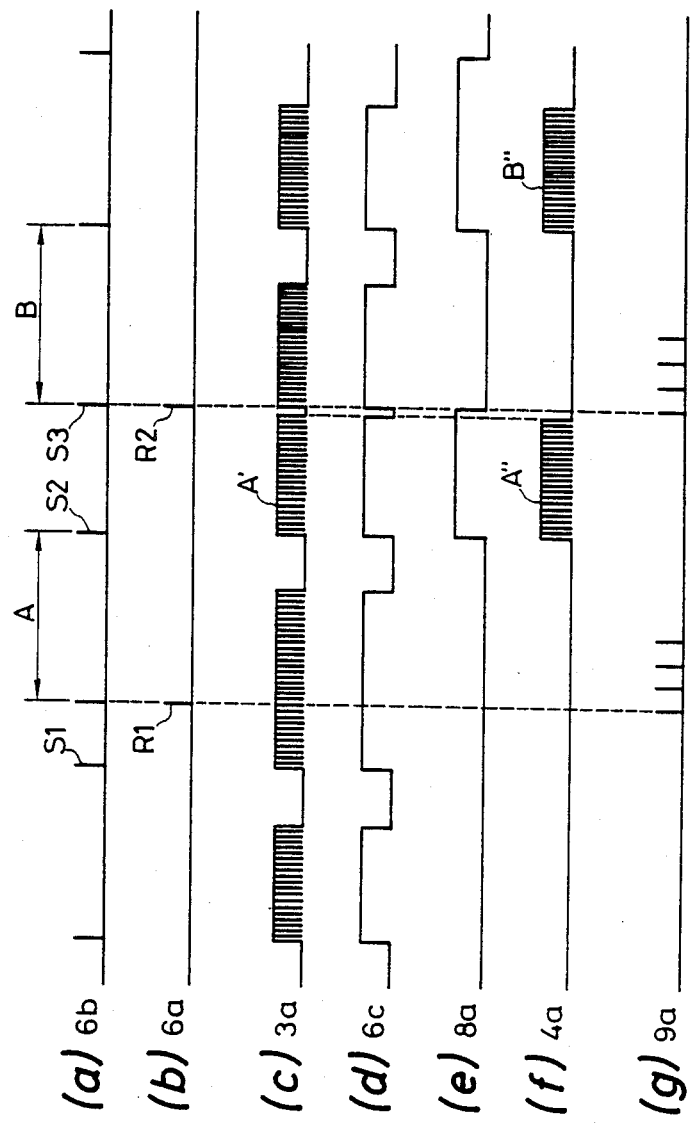

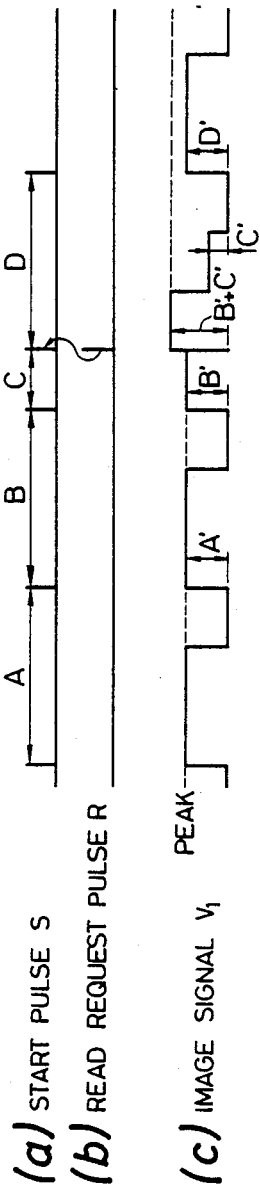
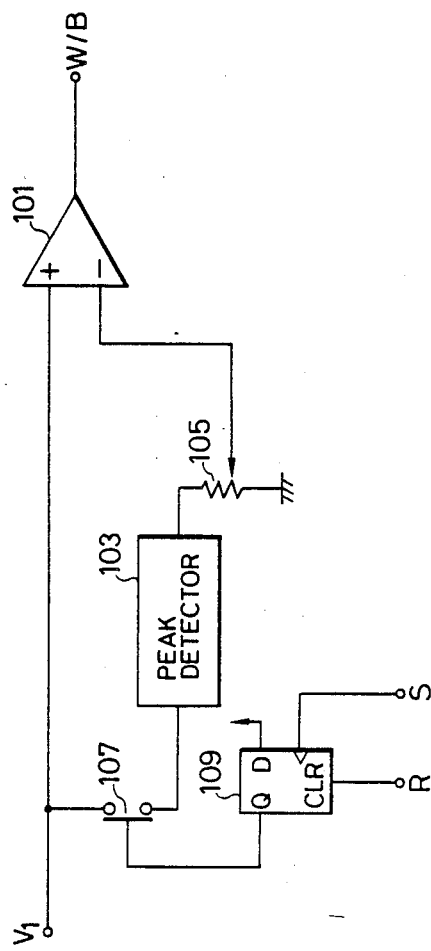
FIG. 6
(a) START PULSE S
(b) READ REQUEST PULSE R
(c) IMAGE SIGNAL V₁
FIG. 7

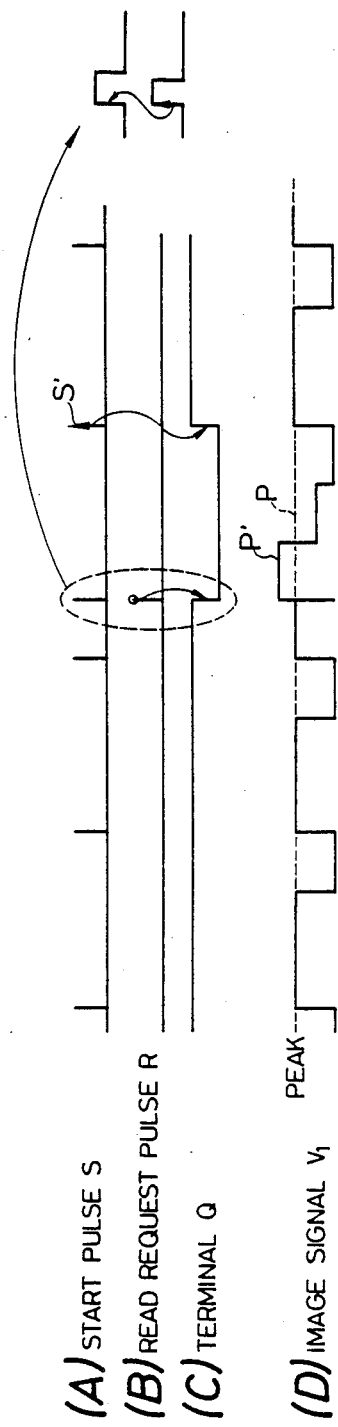

IMAGE READER

BACKGROUND OF THE INVENTION

1. Field of the Invention

The present invention relates to an image reader and more particularly to an image reader for reading out an image signal by an image sensor which stores one scan line of image signal in a predetermined period.

2. Description of the Prior Art

An image reader by an image sensor such as a CCD linear image sensor which stores one scan line of image signal in a predetermined period has been widely used as an image reader for a facsimile or the like. A prior art method for reading the image in such an image reader is explained with reference to FIGS. 1(a) to 1(f), which show timings of signals in a read operation of the image reader by the prior art image readout method.

In a read mode, a start pulse shown in FIG. 1(a) is supplied to the linear image sensor from a control circuit of the image reader at a constant interval, and a charge corresponding to a light quantity sensed, that is, one scan line of image signal of an original document is stored in the linear image sensor, in synchronism with the start pulse, during a storage period between the start pulse and the next start pulse.

As shown in FIG. 1(b), the image signal stored in the linear image sensor in the immediately preceding storage period is discharged as a discharge or driving signal in a predetermined period shorter than the storage period and in synchronism with the start pulse, and it is supplied to a gate connected to an output terminal of the image reader.

When a read request pulse shown in FIG. 1(c) is applied, a gate signal shown in FIG. 1(d) is supplied from the control circuit to the gate in synchronism with the start pulse which immediately follows to the read request pulse. Thus, the gate is opened and the discharge signal of FIG. 1(b) is produced as an output signal shown in FIG. 1(e).

An original sheet drive signal pulse shown in FIG. 1(f) is supplied from the control circuit to an original sheet driver in synchronism with the start pulse immediately following the read request pulse. As a result, the original sheet is moved by one scan line width.

In the prior art method, as described above, the storage and the discharge of one line of image signal of the original sheet are effected in synchronism with the start pulses generated at constant intervals, and the image signal discharged in synchronism with the start pulse immediately following the read request pulse is read and the original sheet is moved by one scan line width in synchronism with the start pulse.

In this readout method, however, whether the image signal stored when the original sheet was stationary or the image signal stored while the original sheet was moving is produced, depends on the timing of the read request pulse.

Thus, in the prior art image readout method, the output image signals include both those stored while the original sheet was stationary and those stored while the original sheet was moving. Accordingly, the scan line density varies and proper image readout is no attained.

SUMMARY OF THE INVENTION

It is an object of the present invention to provide an image reader capable of exactly quantizing an image signal.

It is another object of the present invention to provide an image reader capable of reducing a read time and exactly quantizing an image signal.

The above and other objects of the present invention will be apparent from the following description of the invention.

BRIEF DESCRIPTION OF THE DRAWINGS

FIGS. 3(a)-3(c) and FIGS. 4(a)-4(g) are timing charts of signals in the image reader of FIG. 2, FIGS. 6(a)-6(c) show signal waveforms for illustrating the binarization, FIG. 7 is a circuit diagram of a binarizing circuit in the present embodiment, and FIGS. 8(a)-8(d) show signal waveforms for illustrating the binarization in the present invention.

DETAILED DESCRIPTION OF THE PREFERRED EMBODIMENT

Figure 1:
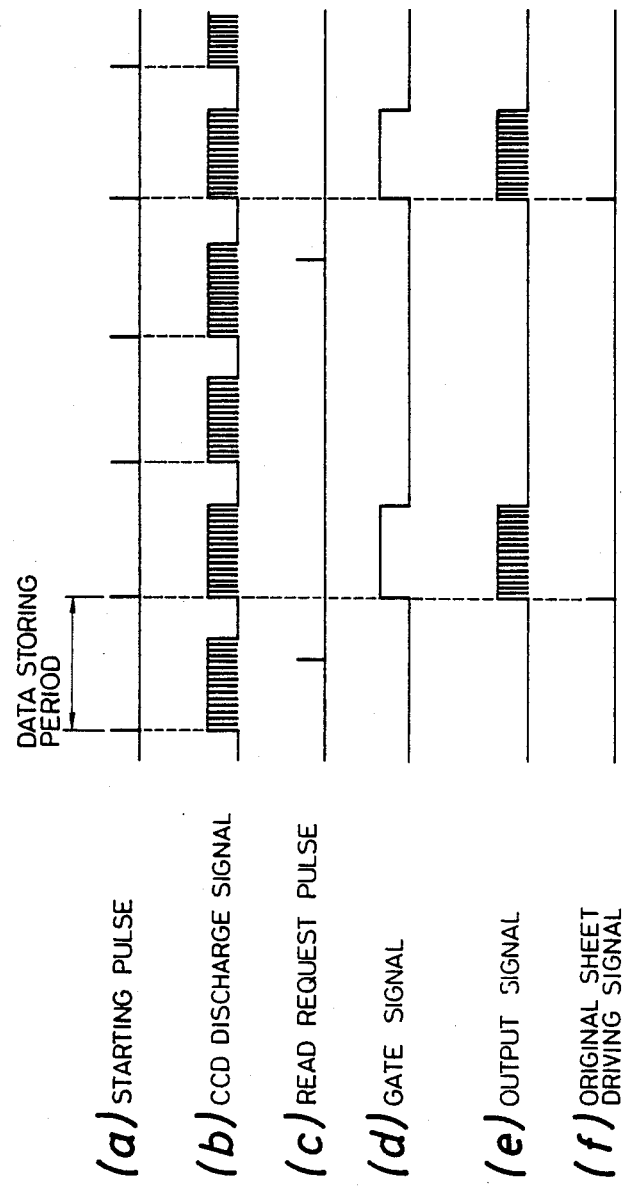
FIGS. 1(a)-1(f) show timing charts of signals in an image reader in a read operation by a prior art image readout method.
Figure 2:
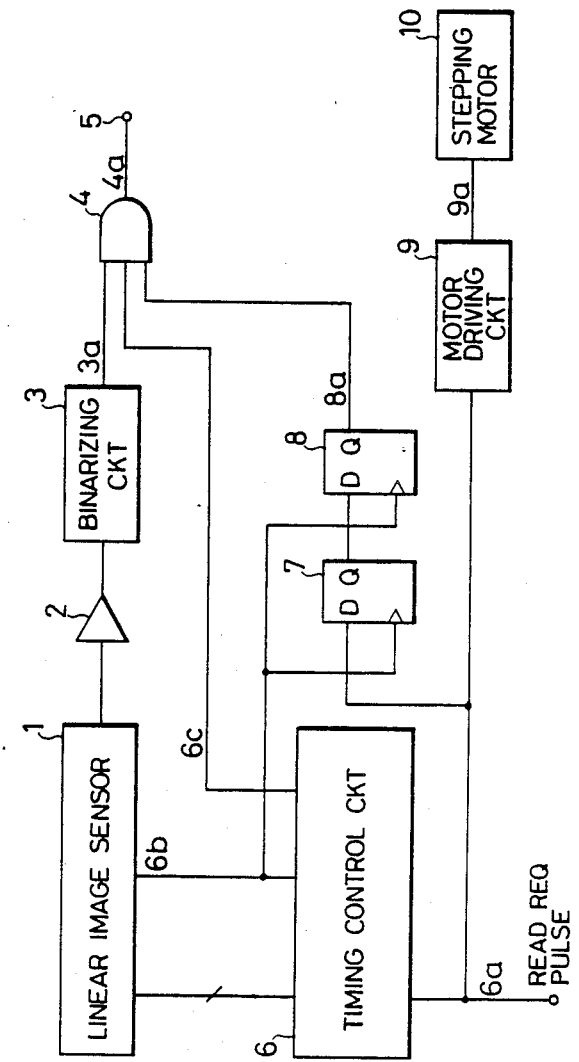
FIG. 2 is a block diagram of an image reader in accordance with one embodiment of the present invention.

FIG. 2 shows a configuration of an image reader in accordance with an embodiment of the present invention.

Numeral 1 denotes a linear image sensor comprising a CCD. It scans an original sheet surface, photo-electrically converts an image and stores one scan line of charge or image signal in accordance with a light quantity sensed in a predetermined period, and the image signal is supplied to an amplifier 2 as an analog signal in the next storage period. The analog image signal amplified by the amplifier 2 is binarized by a binarizing circuit 3 and the signal is supplied to an input of an AND gate 4 through a signal line 3a. An output from the AND gate 4 is supplied to an output terminal 5 of the image reader via a signal line 4a.

On the other hand, numeral 6 denotes a timing control circuit for controlling the whole operation of the image reader. It sends a start pulse to the linear image sensor 1 via a signal line 6b to cause the image signal to be stored and the image signal stored in the immediately previous storage period to be discharged. The control circuit 6 also sends a pulse signal which rises in synchronism with the start pulse and falls in synchronism with the end of the discharge, to the AND gate 4 via a signal line 6c. The timing control circuit 6 receives a read request pulse which is generated periodically, from a host system (not shown) of the image reader via a signal line 6a.

The read request pulse is also supplied to a data input of a D flip-flop 7 connected to the signal line 6a. A Q-output of the D flip-flop 7 is connected to a data input of another D flip-flop 8, and a Q-output of the D flip-flop 8 is connected to the input of the AND gate 4 via a signal line 8a. Clock inputs of the D flip-flops 7 and 8 are connected to the signal line 6b of the timing control circuit 6 through which the start pulse is sent.

Numeral 9 denotes a motor driver for driving a stepping motor 10 which drives an original sheet one scan line width at a time. The motor driver 9 is connected to the signal line 6a of the timing control circuit 6 and supplies a drive signal pulse to the stepping motor 10 via a signal line 9a in response to the read request pulse.

The image read operation of the present embodiment of the image reader is now explained with reference to FIGS. 3(a)–3(c) and FIGS. 4(a)–4(g).

FIGS. 3(a)–3(c) are timing charts for signals for illustrating the operation of the image reader when no read request pulse has been received.

As shown in FIG. 3(c), when the read request pulse is not sent to the timing control circuit 6 via the signal line 6a, the timing control circuit 6 sends the start pulse to the linear image sensor 1 via the signal line 6b at a constant interval as shown in FIG. 3(a).

Thus, the image signal is stored and discharged in synchronism with the start pulse. The discharged image signal is amplified by the amplifier 2, binarized by the binarizing circuit 3 and periodically supplied to the AND gate 4 via a signal line 3a at a predetermined interval shorter than the storage period and in synchronism with the start pulse as shown in FIG. 3(b).

Since the read request pulse is not applied at this moment, the data input of the D flip-flop is low level and the Q-output of the next stage D flip-flop 8 is low level. Accordingly, the AND gate 4 is closed and the binarized image signal is not outputted.

FIGS. 4(a)–4(g) are timing charts for signals for illustrating the operation when the read request pulse is received.

When the read request pulse is sent to the timing control circuit 6 as shown by R1 in FIG. 4(b), the timing control circuit 6 is reset, and the start pulse is sent to the linear image sensor 1 in synchronism with the read request pulse as shown by S1 in FIG. 4(a) so that the store of the image signal in the storage period A and the discharge of the image signal stored in the immediately preceding period are started. The discharged signal is amplified, binarized and supplied to the AND gate 4 via the signal line 3a as shown in FIG. 4(c).

The read request pulse R1 and the timing pulse S1 are simultaneously applied to the data and clock inputs of the D flip-flop 7 so that the Q-output thereof or the data input of the D flip-flop 8 changes to high level. Since the start pulse S1 has already fallen and the clock input of the D flip-flop is low level at this moment, the Q-output thereof remains low. As shown in FIG. 4(e), the output of the signal 8a is low at this moment and the AND gate 4 is not opened. Accordingly, the binarized image signal is not outputted.

On the other hand, in response to the request pulse R1, the motor driver sends the drive pulse to the stepping motor 10 via the signal line 9a in synchronism with the request pulse R1 as shown in FIG. 4(g) so that the original sheet is fed by one scan line pitch.

Then, at the end of the storage period A, the timing control circuit generates the next start pulse S2 as shown in FIG. 4(a). Thus, the store of the image signal and the discharge of the image signal stored in the storage period A take place in the linear image sensor 1. The discharged image signal is amplified, binarized and supplied to the AND gate 4 as shown by A' in FIG. 4(c).

On the other hand, the D flip-flop 8 which has received a high level at the data input responds to the start pulse S2 applied to the clock input to change the Q-output thereof to high level as shown in FIG. 4(e). As a result, the AND gate 4 is opened and the image signal is supplied to the output terminal 5 through the signal line 4a as shown by A″ in FIG. 4(f).

In response to the start pulse S2 applied to the clock input, the D flip-flop 7 changes the Q-output thereof (the data input of the D flip-flop 8) to low level because the data input thereof is low level.

When the read request pulse is then generated as shown by R2 in FIG. 4(b), the above operation is repeated. In response to a start pulse S3 generated in synchronism with the read request pulse and applied to the clock input, the D flip-flop 8 changes the Q-output thereof to low level as shown in FIG. 4(e) and the AND gate 4 is closed.

In the above image readout method, the store of the image signal and the one scan line pitch of feed of the original sheet are effected in synchronism with the read request pulse, and after the predetermined storage period, the stored image signal is outputted. Since the store of the image signal to be outputted and the feed of the original sheet are always in synchronism, the variation of the scan line density due to the instability in the timings of the store of the image signal and the feed of the original sheet, as occurred in the prior art, does not take place. Further, the read time can be reduced.

Figure 5:
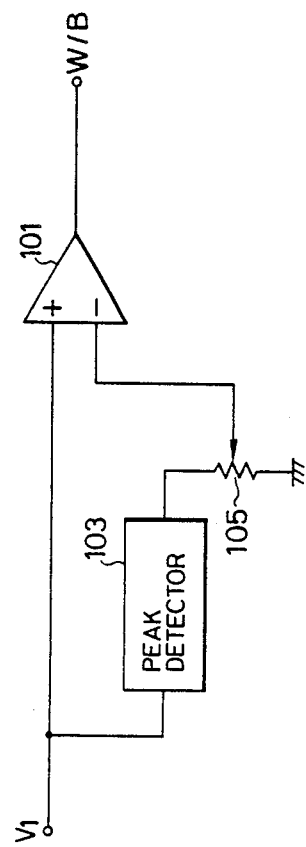
FIG. 5 is a circuit diagram of a circuit for binarizing an image signal.

The binarizing circuit 3 in the present embodiment is now explained. In the normal binarization process, the image signal is peak-detected and the peak value is voltage-divided by resistors to use a divided voltage as a reference level. As shown in FIG. 5, the image sensor sends out an image signal V, which is applied to a positive input terminal of a comparator 101. The image signal is grounded through a peak detector 103 and a resistor 105, and a voltage across the resistor 105 is applied to a negative input terminal of the comparator 101. White and black levels of the image signal applied to the positive input terminal are determined in accordance with a reference level which is determined by the peak voltage applied to the negative input terminal. Thus, the comparator 101 produces a binarized signal.

Figure 3:
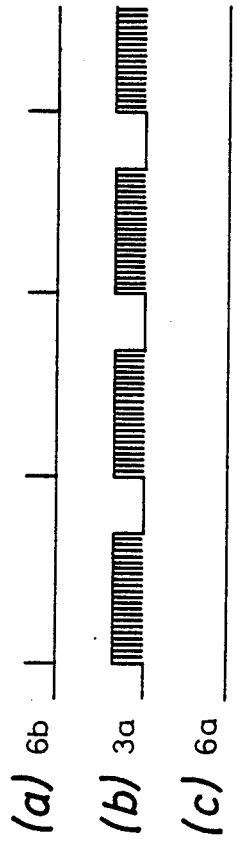

When the image readout method shown in FIGS. 2 to 4 is used, that is, where the linear image sensor stores the image signal in synchronism with the read request pulse and outputs the image signal at the next start pulse, the peak value of the image signal $V_1$ from the linear image sensor changes as shown in FIG. 6(c).

For one period of image signal following the read request pulse, the image signal level increases because of the storage time. Accordingly, if the binarization is effected based on the peak value of this period, the correct binarization will not be attained. In FIG. 6(c), A', B', . . . indicate the image signals in the storage periods A, B, . . .

FIG. 7 shows an embodiment of the binarizing circuit of the present invention. The like elements to those shown in FIG. 5 are designated by the like numerals and the explanation thereof is omitted. In the embodiment of FIG. 7, an analog switch 107 is inserted between the image signal input terminal and the peak detector 103. The analog switch 107 is actuated by a D flip-flop 109 which is set by a start pulse S and cleared by the read request pulse R.

In this circuit, one scan line of image signal in stored in response to the start pulse S shown in FIG. 8(a) and read by the read request pulse R shown in FIG. 8(b). When the read request pulse R is generated, the D flip-flop 109 is cleared and the Q-output thereof changes to low level [see FIG. 8(c)]. Accordingly, the output image signal $V_1$ in the storage time following to the read request pulse R is not supplied to the peak detector 103. Thus, the peak value of the image signal $V_1$ is not detected during this period, and the peak value for this period is not P' but P. The Q-output of the D flip-flop 109 changes to high level in response to the next start pulse S' so that the peak detector 103 is activated and the image signal is binarized in accordance with the reference level determined by the peak value of the image signal.

As explained above, since the peak detection function is disabled for the image signal output period immediately following to the read request pulse, the problem of variation of the reference level due to the rise of the image signal because the storage time is partially added to one cycle of image signal immediately following to the read request signal, is avoided and the proper binarization of the image signal is attained.

As described in detail hereinabove, the present invention prevents the variation of the scan line density and enables the correct quantamization. Further the read time can be reduced because the store of the image starts substantially coincidentally with the read request.

The present invention is not limited to the illustrated embodiments but various modifications may be made within the scope of the appended claims.

What I claim is:

1. An original document reading apparatus, comprising:
    reading means for reading an original document line by line, said reading means being operated at a predetermined cyclic period, wherein, in a first period, read information is stored threin, and in a second period, the stored information is output such that outputting for one line and storing for the next line are performed in parallel;
    transporting means for transporting the original document line by line relative to said reading means;
    means for generating a reading request signal at an irregular period;
    detecting means for detecting a predetermined level of said output signal from said reading means;
    controlling means for allowing the storing operation of said reading means to start in synchronism with said reading request signal; and
    disabling means for disabling said detection by said detecting means with respect to said output signal which is output from said reading means at said predetermined period immediately after generation of said reading request signal.

2. An apparatus according to claim 1, wherein an output from said detecting means is used for quantization of said output signal from said reading means.

3. An apparatus according to claim 1, wherein said detecting means detects a peak level of said output signal of said reading means.

4. An apparatus according to claim 1, wherein said reading means comprises a storing section which stores therein said read information and a transferring section which exteriorly outputs said read information, and wherein said read information is transferred into said transferring section in synchronism with said reading request signal and thereafter said storing section starts the storing operation.

5. An apparatus according to claim 4, further comprising gate means for fetching, as a reading signal, only the information which is stored in said storing section during the transporting operation of said transporting means.

6. An apparatus according to claim 1, wherein said reading means includes a charge coupled device.

7. An original document reading apparatus, comprising:
    reading means for reading an original document line by line;
    transporting means for transporting said original document line by line relative to said reading means;
    means for generating a reading request signal at an irregualar period;
    detecting means for detecting a predetermined level of an output signal from said reading means;
    controlling means for allowing said reading operation of said reading means and said transporting operation of said transporting means to start in synchronism with said reading request signal;
    outputting means for outputting, as a reading signal, only the information which is read by said reading means during said transporting operation of said transporting means; and
    disabling means for disabling said detection of said detecting means with respect to said output signal from said reading means immediately after generation of said reading request signal.

8. An apparatus according to claim 7, wherein an output from said detecting mean is used for quantization of said output signal from said reading means.

9. An apparatus according to claim 7, wherein said detecting means detects a peak level of said output signal of said reading means.

10. An apparatus according to claim 7, wherein said reading means comprises a storing section which stored therein said read information and a transferring section which exteriorly outputs said read information, and wherein said information in said storing section is transferred into said transferring section in synchronism with said reading request signal and thereafter said storing section starts the storing operation.

* * * * *

UNITED STATES PATENT AND TRADEMARK OFFICE
CERTIFICATE OF CORRECTION

PATENT NO. : 4,658,302        Page 1 of 2
DATED      : April 14, 1987
INVENTOR(S): MASAHIRO SAKAMOTO .

It is certified that error appears in the above-identified patent and that said Letters Patent is hereby corrected as shown below:

AT [57] IN THE ABSTRACT

Line 6, "and disabling" should read --and a disabling--.

COLUMN 1

Line 40, delete "to";
   line 68, "no" should read --not--.

COLUMN 3

Line 26, "D flip-flop" should read --D flip-flop 7--.

COLUMN 5

Lines 2 and 14, delete "to";
   line 17, delete "to" (second occurrence);
   line 22, "quantamization." should read --quantization.--.

UNITED STATES PATENT AND TRADEMARK OFFICE
CERTIFICATE OF CORRECTION

PATENT NO. : 4,658,302

DATED : April 14, 1987

INVENTOR(S) : MASAHIRO SAKAMOTO

It is certified that error appears in the above-identified patent and that said Letters Patent is hereby corrected as shown below:

COLUMN 6

Line 26, "irregualar" should read --irregular--;
line 42, "mean" should read --means--.

Signed and Sealed this

Twenty-fourth Day of November, 1987

Attest:

DONALD J. QUIGG

Attesting Officer

Commissioner of Patents and Trademarks